United States Patent [19]

Vriens et al.

[11] Patent Number: 4,988,203
[45] Date of Patent: Jan. 29, 1991

[54] DEVICE FOR INSPECTING AN INTERFERENCE FILTER FOR A PROJECTION TELEVISION DISPLAY TUBE

[75] Inventors: Leendert Vriens; Maurits R. T. Smits, both of Eindhoven, Netherlands

[73] Assignee: U.S. Philips Corporation, New York, N.Y.

[21] Appl. No.: 329,915

[22] Filed: Mar. 28, 1989

[30] Foreign Application Priority Data

Jan. 12, 1989 [NL] Netherlands ................. 8900070

[51] Int. Cl.$^5$ .......................................... G01N 21/00
[52] U.S. Cl. .................................. 356/402; 350/166; 356/416; 356/418; 356/419
[58] Field of Search ............... 356/300, 402, 416, 418, 356/419; 350/166, 320

[56] References Cited

U.S. PATENT DOCUMENTS

| | | | |
|---|---|---|---|
| 2,624,238 | 1/1953 | Widdop et al. | 350/166 |
| 2,936,732 | 5/1960 | Ring et al. | 350/166 |
| 4,634,926 | 1/1987 | Vriens et al. | 313/474 |
| 4,798,994 | 1/1989 | Rijpers et al. | 313/478 |
| 4,804,884 | 2/1989 | Vries et al. | 313/474 |

Primary Examiner—F. L. Evans
Attorney, Agent, or Firm—John C. Fox

[57] ABSTRACT

In a device for measuring the cut-off wavelength of an interference filter for a projection television display tube, the interference filter and a bandpass filter are arranged one behind the other. The bandpass filter has a transmission characteristic with a cut-off wavelength which approximately coincides with the desired cut-off wavelength of the interference filter, but with a slope varying in the opposite direction. A white light beam generated in a light source is incident through the two filters. The intensity, which is measured by a detector on the other side of the filters, is a measure of the cut-off wavelength of the interference filter. The device may have a second measuring system for measuring the absorption of the interference filter.

20 Claims, 3 Drawing Sheets

DEVICE FOR INSPECTING AN INTERFERENCE FILTER FOR A PROJECTION TELEVISION DISPLAY TUBE

BACKGROUND OF THE INVENTION

The invention relates to a device for inspecting an interference filter for a projection television display tube.

As compared with a television having a conventional direct-view screen, currently known projection television systems have a moderate brightness, a colour rendition which is not very good, a moderate contrast and some loss of resolution. The moderate colour rendition is mainly caused by the fact that the conventionally used Tb-activated green phosphor has too high a contribution of orange and red spectral lines. The defocus is caused to a considerable extent by the chromatic aberration in the lenses, which is particularly noticeable for phosphors having a wide range of spectral emissions, such as the conventionally used green (Tb-activated) and blue (ZnS:Ag) phosphors.

To cope with these problems it has been proposed, for example in EP-A No. 0,174,320 to which U.S. Pat. No. 4,634,926 corresponds, to arrange an interference filter between the phosphor layer and the glass of the display screen. Within the range of visible light, the proposed interference filter is a short wavelength transmission filter. It transmits light of the desired wavelength in the forward direction and at angles of up to approximately 35° to 40° to the normal. At a larger angle to the normal of the display screen the interference filter reflects the light into the phosphor layer. It is scattered there and may subsequently leave the phosphor layer approximately in the forward direction so that it is passed by the filter. Thus, the interference filter causes an increase of the light of the desired wavelength in the forward direction.

At a smaller wavelength the angular range with respect to the normal at which light still passes is larger, so that the relative increase of the light in the forward direction (within the angle of acceptance of the projection lens) is smaller. At a longer wavelength the angular range is smaller or the light is even completely blocked. Thus, the interference filter operates colour-selectively in such a way that the colour of the light transmitted by the tube improves, the brightness increases and the chromatic aberration in the lenses decreases.

It will be evident that the quality of the image, and particularly the colour rendition, depends on the quality of the interference filters. It is therefore necessary to inspect at least a representative part of the filters from each production batch.

A filter can be measured by determining its transmission and reflection properties at a number of wavelengths. This method may be performed without any problem in a laboratory, but it is too complicated, time-consuming and hence too costly for use in mass-manufacturing in a factory. It is thus desirable to have a simple, fast and inexpensive test in which a minimum number of parameters to be measured suffices.

SUMMARY OF THE INVENTION

It is an object of the invention to provide a device for such a test which is to be performed by someone who is not specially skilled at optical measurements.

To this end, a device according to the invention comprises at least one first light source for generating a first light beam which propagates along a first light path, means for positioning the interference filter in the first light path, means for obtaining a spectral distribution in the first light beam, which spectral distribution has a gradient in a wavelength range within which a desired cut-off wavelength of the interference filter is located, and at least one first detector for measuring the intensity of the first light beam after it has traversed the interference filter or has been reflected thereby.

The invention utilizes the fact that the desired interference filters have a short wave transmission characteristic. For light with a short wavelength the transmission coefficient is close to one, whereas for light with a long wavelength the coefficient is close to zero (light is substantially completely reflected). Between these two ranges there is a transition range in which the transmission coefficient decreases from approximately unity to approximately zero. The location of the transition range is defined in the first instance by the cut-off wavelength which is defined as the wavelength for which the transmission coefficient is $\frac{1}{2}$.

The invention is further based on the recognition that the cut-off wavelength for light in the forward direction is the most important single parameter which determines the properties of the interference filter, provided that the filter has substantially no absorption. This will be described in greater detail hereinafter.

The invention is also based on the recognition that the value of the cut-off wavelength can be accurately determined by choosing a light beam whose spectral distribution is in the wavelength range where the transition range of the filter should be located, and whose intensity depends to a considerable extent on the wavelength. For measurement in transmission, the spectral distribution of the light beam should be such that the intensity increases with a larger wavelength, whereas for measurement in reflection the reverse is the case, i.e. the light beam should have a large contribution of short wavelengths and a small contribution of long wavelengths.

The intensity measured by the detection system is the integrated product of the spectral distribution within the light beam and the transmission or reflection coefficient of the interference filter.

The device according to the invention preferably has the property that the gradient of the spectral distribution in the said wavelength range has a value of between approximately $7.10^6$ m$^{-1}$ and approximately $75.10^6$ m$^{-1}$. Within a factor of 3 this corresponds to a relative change of 2.5% per nm wavelength. For an interference filter as described in the above-mentioned application EP-A No. 0,174,320, 2.5% per nm means that a 1% displacement in the value of the cut-off wavelength corresponds to a variation of approximately 10% in the intensity observed by the detector.

The spectral distribution can be realised by means of a light source which generates only light of the desired wavelengths, but the device according to the invention preferably has a white light source which is adapted to generate a white light beam, and means for obtaining the desired spectral distribution, the means comprising a filter arranged in the first light path, which filter has a wavelength-dependent transmission coefficient. A white light source means that the intensity of the generated radiation in the relevant wavelength range is equal for substantially all wavelengths. The desired continuous spectral distribution can then be accurately imposed by means of a filter. The filters may be bandpass filters which pass only radiation within a given range, but they may also be different filters, for example longwave transmission filters or coloured glass filters. The most important requirement to be imposed on the filters is the behaviour of the cut-off characteristic at the short wavelength side.

The interference filter on the display screen is adapted to the colour of the display tube. Thus to be able to inspect the interference filters of the "red", the "green" and the "blue" tubes, the device according to the invention comprises a plurality of filters, each having a different variation of the transmission coefficient as a function of the wavelength, which filters are exchangeable. By arranging the filters in, for example a rotary or movable filter holder, it is possible to change over from one type of filter to another type in a simple and fast manner.

The device according to the invention also has the property that the filter is arranged in the first light path between the interference filter and the detection system. In this way scattered light from the ambience is prevented from reaching the detection system.

The display screen of a projection televsion display tube may be curved as described, for example in EP-A No. 0,271,165 to which U.S. Pat. No. 4,804,884 corresponds. To obtain a good operation of the interference filter patent this proposes to vary the properties of the interference filter in dependent on its location on the screen. To be able to inspect a filter having different properties at different locations, the measurement of the cut-off wavelength is performed at different locations on the filter. Since the test only checks whether the filter is correctly provided, a measurement at two locations is generally sufficient.

To provide for this possibility, the device according to the invention has the ability to measure the cut-off wavelength at a second location of the interference filter. For this purpose, the device comprises a second light source for generating a second light beam which propagates along a second light path extending at some distance from the first light path, and the device further comprises means for obtaining a spectral distribution in the second light beam, which spectral distribution has a gradient in a wavelength range within which a desired cut-off wavelength of the filter is located a second detector for measuring the intensity of the second light beam after it has traversed the interference filter or has been reflected thereby.

The device is thus doubled, as it were, the first light beam being used for example, for inspecting a central location on the screen and the second light beam being used for inspecting a peripheral location. The peripheral location is preferably chosen to be such that the properties of the interference filter are identical to those in the central part of the filter. The first and second light sources may actually be a single light source from which two light beams are derived. If necessary, the interference filter may be inspected at more than two locations. To this end the measurement can be performed in a plurality of steps, or more than two light beams, filters and detectors may be used.

Since the quality of the filter is not only determined by the cut-off wavelength but also by the absorption in the filter, this absorption should be also measured. It is sufficient to measure the absorption coefficient at one location of the filter because the vapour deposition process with which the filter is provided takes place under equal conditions over the entire surface of the filter. The device according to the invention thus also comprises a further light source for generating a further light beam which propagates along a further light path, further means for imposing a spectral distribution on the further light beam which is substantially completely within a wavelength range for which the interference filter is substantially completely transparent, and a further light-sensitive detector for measuring the intensity of the further light beam after it has traversed the interference filter.

The further light source is preferably adapted to generate a white light beam and the further means for imposing a spectral distribution comprise a bandpass filter. In this way the spectral distribution can be easily changed by replacing the bandpass filter. Also for measuring the absorption coefficient the bandpass filter may be arranged between the interference filter to be measured and the light-sensitive detector.

In a preferred embodiment of the device according to the invention the further light source is identical to the first light source, the further light path partly coincides with the first light path and the device comprises a beam splitter for separating the further light path from the first light path. By using the same light source, both for measuring the cut-off wavelength and the absorption coefficient, the device can be realised in a simpler manner. This has a certain cost-saving effect.

In the device according to the invention at least one of the detectors is adapted to measure the radiometric intensity. It has been found that the radiometric intensity for each wavelength to be measured changes by approximately 10% for the "blue", "green" and "red" interference filters, if the value of the cut-off wavelength changes by 1%.

BRIEF DESCRIPTION OF THE DRAWINGS

The invention will now be described in greater detail by way of example with reference to the accompanying drawings in which.

DETAILED DESCRIPTION OF THE PREFERRED EMBODIMENTS

Figure 1:
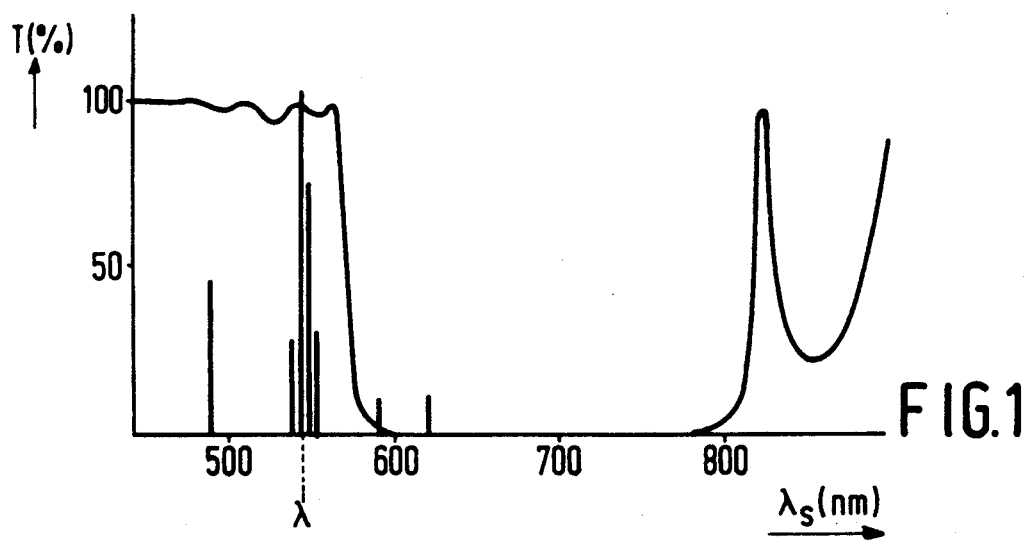
FIG. 1 shows graphically the transmission coefficient T in percent as a function of the wavelength $\lambda$ in nanometers for a "green" short wavelength transmission interference filter and for a "green" Tb-activated phosphor.

In FIG. 1 the transmission coefficient T is shown as a function of the wavelength $\lambda$ for light which is perpendicularly incident (at 0° relative to the normal) on the screen. The transmission characteristic is that of a filter for a "green" display tube. The short-wave transmission behaviour and the broad reflection band between 570 and 780 nm can be read directly from the graph. A number of spectral lines of a typical green phosphor is also shown diagrammatically.

Figure 2:
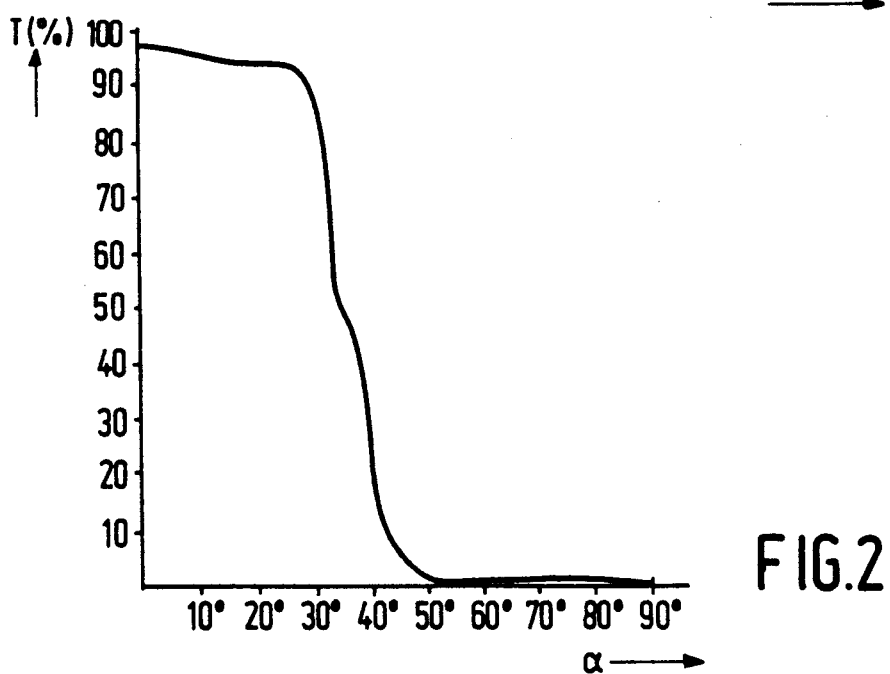
FIG. 2 shows graphically the transmission coefficient for the same filter as a function of the angle of incidence $\alpha$ for light having a wavelength of 545 nm.

FIG. 2 shows the transmission coefficient of the same interference filter as a function of the angle $\alpha$ of the direction of incidence of the light relative to the normal of the filter for a wavelength of 545 nm. The value of $\alpha$ for which the transmission coefficient is 50% is approximately 35°. Light which is incident on the filter at a larger angle is largely reflected. FIGS. 1 and 2 are derived from EP-A No. 0,174,320, to which reference is made for further details about the interference filter.

Figure 3:
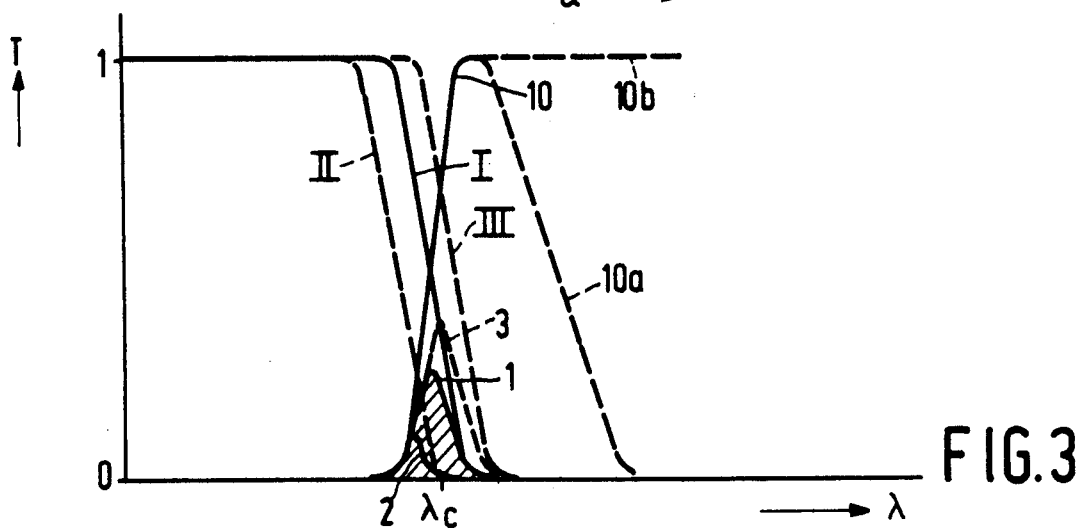
FIG. 3 illustrates graphically the method according to the invention in terms of various relationships between T and $\lambda$.

FIG. 3 shows the relationships between T and $\lambda$ derived from the operation of the inspection device according to the invention. In this Figure the curve 10 denotes the spectral distribution around a wavelength $\lambda$ for a hypothetical light beam. The variation can be obtained, for example by arranging a filter in the light beam generated by a white light source. The curve I illustrates the variation of the transmission coefficient T of an interference filter to be inspected whose cut-off wavelength is $\lambda_c$. The intensity of the light beam after passing the interference filter is proportional to the integrated product of the curves I and 10. In the Figure this is denoted by the shaded area under the curve 1.

If the cut-off wavelength of the interference filter is slightly smaller, for example if the interference filter has a variation as denoted by the curve II, the intensity of the light beam after passing the interference filter is much lower. This is shown in the Figure as the area under the curve 2.

The intensity of the light beam after the interference filter is much higher if the cut-off wavelength of the filter is slightly larger, for example as denoted by the curve III and the area under the curve 3. By this method a small displacement (for example 1%) of the cut-off wavelength may thus lead to an easily measurable variation (for example 10%) of the intensity of the light beam which is received by the detector behind the interference filter.

As is apparent from the Figure, the spectral distribution of the light beam on the long-wavelength side is not important. A narrow band light beam (curve 10a) or a broadband light beam (curve 10b) yield the same result for the measured intensity.

Figure 4A:
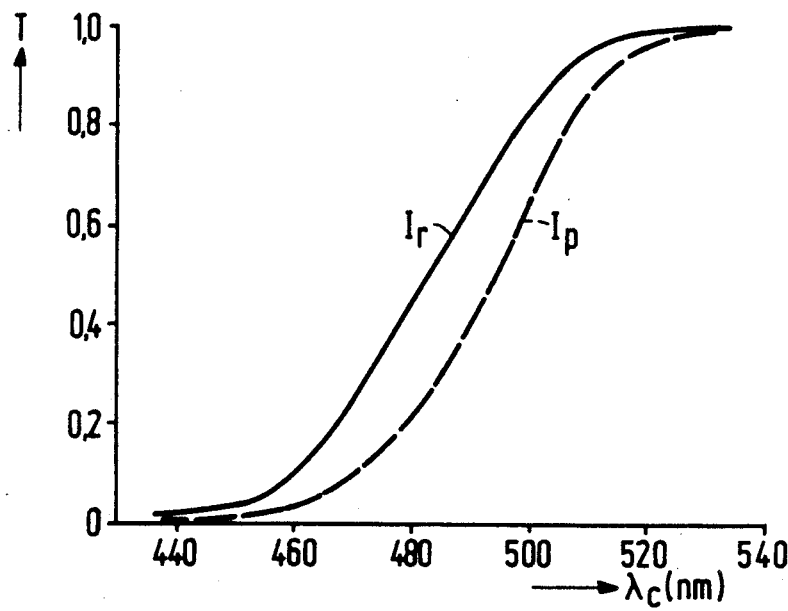
FIGS. 4a, 4b and 4c show the graphically the variation of T as a function of the value of $\lambda c$, the cut-off wavelength for "blue", "green" and "red" interference filters, respectively.
Figure 4B:
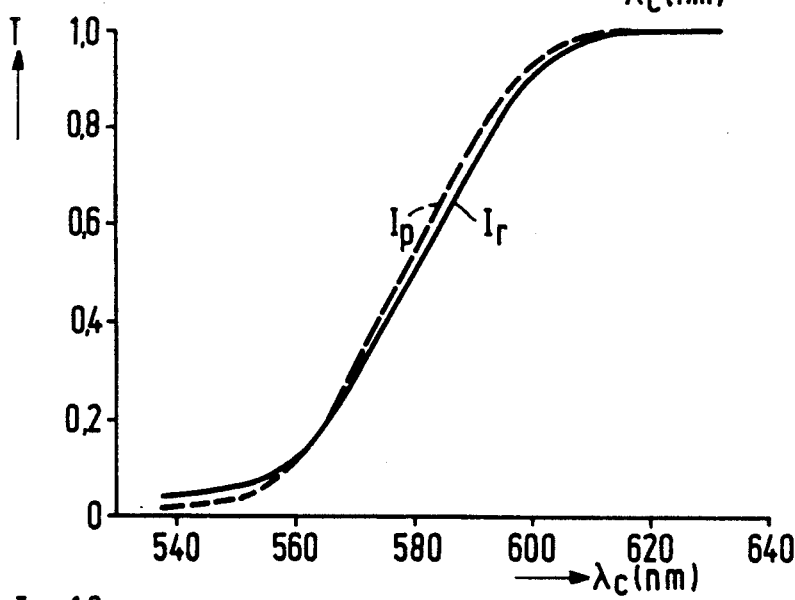
Figure 4C:
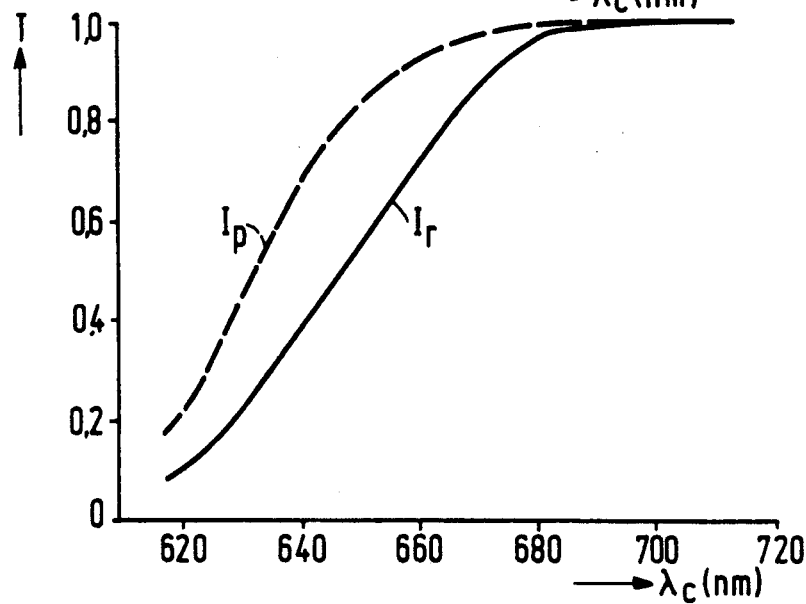

FIGS. 4a, 4b and 4c show the transmission coefficient T as a function of the cut-off wavelength $\lambda c$, received by a radiometric and photometric detector for a "blue", "green" and "red" interference filter, respectively. Use is made of a white light source and a bandpass filter having an FWHM value of 40 nm and a central wavelength of 480 nm for the "blue" filter, 580 nm for the "green" filter and 650 nm for the "red" filter. The FWHM value thus is 6% to 8% of the value of the central wavelength. On the one hand, the short wavelength edge of the bandpass filter is sufficiently large with respect to the required 1% reproducibility of the cut-off wavelength. On the other hand, the edge is sufficiently steep so that the transmitted light intensity varies to a sufficiently strong extent at a small displacement of the cut-off wavelength.

The cut-off wavelength is plotted on the horizontal axis and the observed radiometric and photometric intensities $I_r$ and $I_p$ are plotted in relative quantities on the vertical axis. As is shown in FIG. 4a, the radiometric intensity $I_p$, (or a similar entity, as an absolute calibration is not required), gives the best dependence between the intensity and the cut-off wavelength for the "blue" interference filter. Around the desired cut-off wavelength (480 nm) $I_r$ varies approximately 2% per nm, which is equivalent to a variation of almost 10% when varying the cut-off wavelength or the filter thickness by 1%. The photometric intensity, denoted by $I_p$, has a less large variation around the desired cut-off wavelength and is thus less suitable as a measuring quantity.

FIG. 4b shows that for the "green" filter both the radiometric and the photometric intensity have a comparable variation as a function of the cut-off wavelength in the relevant range around 580 nm. The variation in $I_r$ is 2.3% per nm, i.e. 13% intensity variation for every 1% of displacement in the cut-off wavelength.

FIG. 4c shows for the "red" interference filter that, like the case of the "blue" filter, the radiometric intensity $I_r$ is a better measuring quantity than the photometric intensity $I_p$. FIG. 4c shows an intensity variation of 1.6% per nm, which is equal to 10.5% for every percent of filter thickness variation for $I_r$.

Thus, it is preferred to use the radiometric intensity as a measuring quantity. A variation of 1% in the thickness of the interference filter, and hence in the cut-off wavelength, leads in all three cases to a variation of approximately 10% of the measured intensity. The method is thus both simple and sensitive.

An additional advantage is that in the absence of the interference filter the relative intensity must be 100%. Calibration of the system is thus very simple.

If the bandpass filters for imposing the spectral distribution on the light beam have a smaller pass region, e.g., an FWHM value which is smaller than 40 nm, the relative sensitivity of the method increases, the term "relative" being understood to refer to the detected light signal without an interference filter in the light beam. If the FWHM value is chosen to be larger than 40 nm, the relative sensitivity is smaller. However, the absolute sensitivity remains equal in both cases.

The behaviour of the bandpass filter on the short wavelength edge is decisive for the sensitivity. The bandpass filter may be replaced without any problem by a long-wave transmission filter, although the system can be more easily calibrated if a bandpass filter is used. Instead of a bandpass filter it is also possible to use a coloured glass filter. The firms of Schott and Hoya market coloured glass filters with a bandpass or long-wave transmission characteristic. These filters are suitable for use in the device according to the invention, provided that the short wave edge is sufficiently steep and is approximately at the correct value. Such filters are, for example, Schott OG530 or OG550 for the "green" interference filter, Schott RG610 or RG630 for the "red" filter and Schott GG435 for the "blue" filter.

Figure 5:
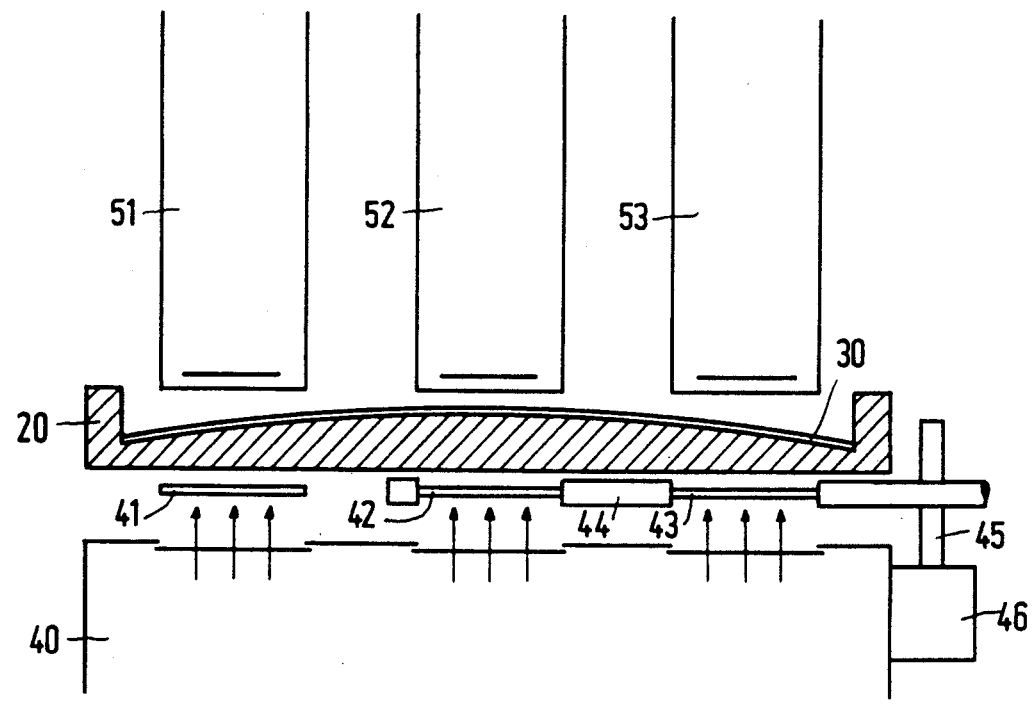
FIG. 5 shows diagrammatically a first embodiment of the device according to the invention.

FIG. 5 shows diagrammatically a first embodiment of a device according to the invention. A transparent display screen 20 with an interference filter 30 provided thereon is present between a light source 40 and three detectors 51, 52 and 53. The light source 40 generates three light beams which are incident on the three detectors via the display screen. In addition to the display screen, a filter for imposing a spectral distribution on the light beam is arranged in the light path of each light beam.

The filter 42 arranged in the light beam which is incident through the centre of the display screen comprises a bandpass filter for measuring the cut-off wavelength. The intensity detected by the detector 52 is thus a measure of the value of the cut-off wavelength. The filter 43 is also a bandpass filter whose short wavelength edge is located at the position of the desired cut-off wavelength. With the aid of this filter and the detector 53 the cut-off wavelength is thus measured at a second location of the interference filter. Preferably, this second location should have the same desired cut-off wavelength as the centre of the screen, but a deviating value is of course not excluded.

The filter 41 is a bandpass filter whose transmitted wavelengths are located in the range for which the interference filter is transparent. The intensity detected by the detector 51, which receives the light passing through the filter 41 and the interference filter 30, is a measure of the absorption occurring in the interference filter 30.

To be able to measure the three different types of interference filters in a simple manner by means of the device, the filters 42 and 43 are arranged in a rotatable wheel 44. In addition to the two filters shown, the wheel also comprises bandpass filters for measuring the interference filters with a different desired cut-off wavelength. By rotating the wheel 44 by means of a drive 46 about a shaft 45, the filters 42 and 43 are replaced by filters for performing a measurement of an interference filter with a different cut-off wavelength.

Figure 6:
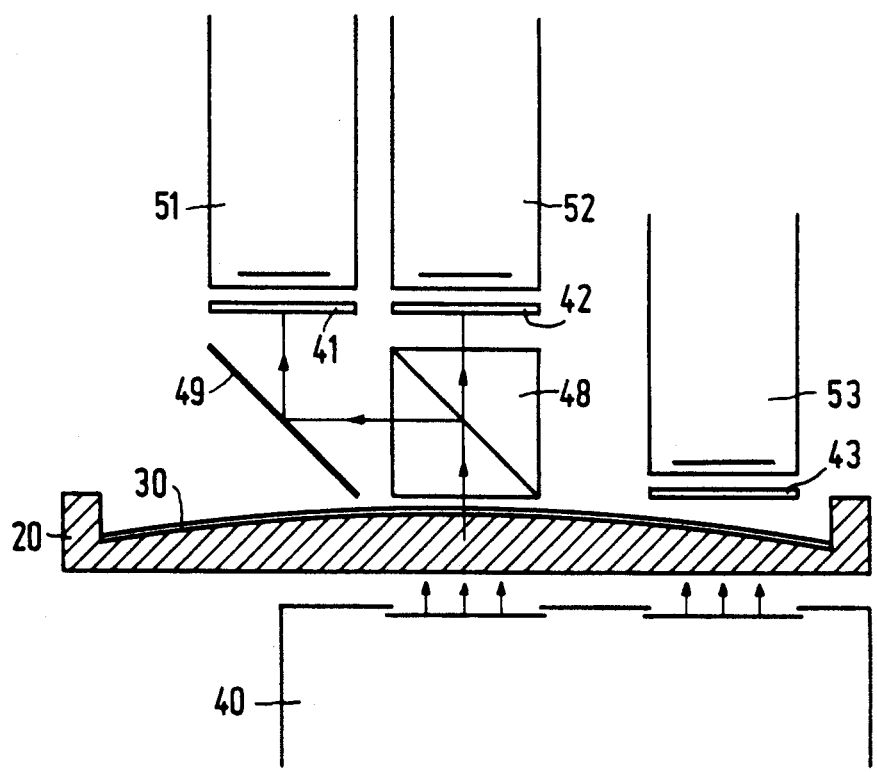
FIG. 6 shows diagrammatically a second embodiment of the device according to the invention.

The filters 41, 42 and 43 may be arranged at any position in the light beams, not only between the light source and the interference filter to be measured, but also between the interference filter and the detectors. In this case it is sufficient to have a light source which generates only two light beams. An embodiment of the device according to the invention, in which this is used, is shown diagrammatically in FIG. 6. In this Figure comparable details have the same reference numerals as in FIG. 5.

The light source 40 emits two light beams which traverse the interference filter 30 at two different locations. One of the light beams traverses the bandpass filter 43 after it has passed the interference filter 30 and is incident on the detector 53. As in the above-described embodiment, this determines the cut-off wavelength at a peripheral location of the interference filter.

After it has traversed the interference filter 30, the other light beam is incident on a beam splitter 48, for example a semi-transparent mirror or a splitting cube. The two sub-beams coming from the beam splitter are each incident on one of the two filters 41 or 42, possibly via a mirror 49. The filter 41 is a bandpass filter whose transmitted spectrum is completely passed by the interference filter 30. Thus, this determines the absorption of the interference filter. The filter 42 is a bandpass filter with which the cut-off wavelength is determined.

We claim:

1. A device for inspecting an interference filter for a projection television display tube, which device comprises:
    at least one first light source for generating a first light beam which propagates along a first light path,
    means for positioning the interference filter in the first light path,
    means for obtaining a spectral distribution in the first light beam, which spectral distribution has a gradient in a wavelength range within which a desired cut-off wavelength of the interference filter is located, and at least one first detector for measuring the intensity of the first light beam after it has traversed the interference filter or has been reflected thereby.

2. A device as claimed in claim 1, wherein the gradient of the spectral distribution in the said wavelength range has a value of between approximately $7.10^6$ m$^{-1}$ and approximately $75.10^6$ m$^{-1}$.

3. A device as claimed in claim 2, wherein the light source generates a white light beam and the means for obtaining a spectral distribution comprise a filter arranged in the first light path, said filter having a wavelength-dependent transmission coefficient.

4. A device as claimed in claim 3, wherein a plurality of filters is provided, the filters each having a different variation of the transmission coefficient as a function of the wavelength, said filters being exchangeable.

5. A device as claimed in claim 3, wherein the filter is arranged in the first light path between the interference filter and the first detector.

6. A device as claimed in claim 5, wherein, for measuring the cut-off wavelength at a second location of the interference filter, the device comprises a second light source for generating a second light beam which propagates along a second light path extending at some distance from the first light path, means for obtaining a spectral distribution in the second light beam, which spectral distribution has a gradient in a wavelength range within which a desired cut-off wavelength of the filter is located, and a second detector for measuring the intensity of the second light beam after it has traversed the interference filter or has been reflected thereby.

7. A device as claimed in claim 6, wherein the device comprises a further light source for generating a further light beam which propagates along a further light path, further means for imposing a spectral distribution on the further light beam which is substantially completely within a wavelength range for which the interference filter is substantially completely transparent, and a further light-sensitive detector for measuring the intensity of the further light beam after it has traversed the interference filter.

8. A device as claimed in claim 7, wherein the further light source generates a white light beam and the further means for imposing a spectral distribution comprise a bandpass filter.

9. A device as claimed in claim 8, wherein the bandpass filter is arranged in the further light path between the interference filter and the further light-sensitive detector.

10. A device as claimed in claim 9, wherein the further light source is identical to the first light source, the further light path partly coincides with the first light path and wherein the device comprises a beam splitter for separating the further light path from the first light path.

11. A device as claimed in claim 10, wherein the intensity measured by at least one of the detectors is the radiometric intensity.

12. A device as claimed in claim 7, wherein the further light source is identical to the first light source, the further light path partly coincides with the first light path and wherein the device comprises a beam splitter for separating the further light path from the first light path.

13. A device as claimed in claim 12, the intensity measured by wherein at least one of the detectors is the radiometric intensity.

14. A device as claimed in claim 3, wherein the device comprises a further light source for generating a further light beam which propagates along a further light path, further means for imposing a spectral distribution on the further light beam which is substantially completely within a wavelength range for which the interference filter is substantially completely transparent, and a further light-sensitive detector for measuring the intensity of the further light beam after it has traversed the interference filter.

15. A device as claimed in claim 14, wherein the further light source is identical to the first light source, the further light path partly coincides with the first light path and wherein the device comprises a beam splitter for separating the further light path from the first light path.

16. A device as claimed in claim 3, wherein, for measuring the cut-off wavelength at a second location of the interference filter, the device comprises a second light source for generating a second light beam which propagates along a second light path extending at some distance from the first light path, means for obtaining a spectral distribution in the second light beam, which spectral distribution has a gradient in a wavelength range within which a desired cut-off wavelength of the filter is located, and a second detector for measuring the intensity of the second light beam after it has traversed the interference filter or has been reflected thereby.

17. A device as claimed in claim 1, wherein, for measuring the cut-off wavelength at a second location of the interference filter, the device comprises a second light source for generating a second light beam which propagates along a second light path extending at some distance from the first light path, means for obtaining a spectral distribution in the second light beam, which spectral distribution has a gradient in a wavelength range within which a desired cut-off wavelength of the filter is located, and a second detector for measuring the intensity of the second light beam after it has traversed the interference filter or has been reflected thereby.

18. A device as claimed in claim 17, wherein the device comprises a further light source for generating a further light beam which propagates along a further light path, further means for imposing a spectral distribution on the further light beam which is substantially completely within a wavelength range for which the interference filter is substantially completely transparent, and a further light-sensitive detector for measuring the intensity of the further light beam after it has traversed the interference filter.

19. A device as claimed in claim 1, wherein the light source generates a white light beam and the means for obtaining a spectral distribution comprise a filter arranged in the first light path, said filter having a wavelength-dependent transmission coefficient.

20. A device as claimed in claim 19, wherein, for measuring the cut-off wavelength at a second location of the interference filter, the device comprises a second light source for generating a second light beam which propagates along a second light path extending at some distance from the first light path, means for obtaining a spectral distribution in the second light beam, which spectral distribution has a gradient in a wavelength range within which a desired cut-off wavelength of the filter is located, and a second detector for measuring the intensity of the second light beam after it has traversed the interference filter or has been reflected thereby.

* * * * *